(12) United States Patent
Soatti et al.

(10) Patent No.: US 11,148,749 B2
(45) Date of Patent: Oct. 19, 2021

(54) SUPPORTING SYSTEM FOR A PHONIC WHEEL SENSOR

(71) Applicant: PIAGGIO & C. S.P.A, Pontedera (IT)

(72) Inventors: Piero Soatti, Pontedera (IT); Alessandro Bonora, Pontedera (IT); Roberto Calo', Pontedera (IT)

(73) Assignee: PIAGGIO & C. S.P.A., Pontedera (IT)

( * ) Notice: Subject to any disclaimer, the term of this patent is extended or adjusted under 35 U.S.C. 154(b) by 0 days.

(21) Appl. No.: 16/347,331

(22) PCT Filed: Nov. 3, 2017

(86) PCT No.: PCT/IB2017/056869
§ 371 (c)(1),
(2) Date: May 3, 2019

(87) PCT Pub. No.: WO2018/083642
PCT Pub. Date: May 11, 2018

(65) Prior Publication Data
US 2019/0276112 A1      Sep. 12, 2019

(30) Foreign Application Priority Data
Nov. 4, 2016   (IT) .......................... 102016000111381

(51) Int. Cl.
*B60T 8/66*       (2006.01)
*B62L 1/00*       (2006.01)
(Continued)

(52) U.S. Cl.
CPC ................ *B62L 1/005* (2013.01); *B60T 8/00* (2013.01); *B60T 8/329* (2013.01); *B60T 8/3225* (2013.01);
(Continued)

(58) Field of Classification Search
CPC ...... B60T 8/329; B60T 8/3225; B60T 8/1706; B62J 11/19; B62J 45/12; B62J 45/40; B62J 45/412; B62J 45/413; B62J 45/423
See application file for complete search history.

(56) References Cited

U.S. PATENT DOCUMENTS 7,661,771 B2 *   2/2010   Nimura ..................... B62J 99/00
                                                                  303/137
7,901,013 B2 *   3/2011   Ishida ...................... B62J 99/00
                                                                  303/168
(Continued)

FOREIGN PATENT DOCUMENTS

DE     10 2007 053339 A1    5/2008
JP     H02 122356 U          10/1990
(Continued)

OTHER PUBLICATIONS

Machine translation of JP 2007-078549 (no date).*

*Primary Examiner* — Nicholas J Lane
(74) *Attorney, Agent, or Firm* — McGlew and Tuttle, P.C.

(57) ABSTRACT

A supporting structure (100) for phonic wheel sensor (200) and brake caliper (300), comprises: a main body (1) fastened or which can be fastened to a stem of a fork (F) of a motorbike; a wheel support (2) connected to said main body (1) for supporting a wheel of the motorbike; and an extension (3) which develops from said main body (1) and comprises a fastening device (30) for a brake caliper (300). Two pass-through openings (31, 32) are formed in said extension (3), a first pass-through opening (31) for housing the phonic wheel sensor (200) and a second pass-through opening (32) for the passage of a cable (201) of the phonic wheel sensor (200).

20 Claims, 3 Drawing Sheets

(51) Int. Cl.
*B60T 8/32* (2006.01)
*B62J 99/00* (2020.01)
*F16D 55/2265* (2006.01)
*F16D 65/00* (2006.01)
*B60T 8/00* (2006.01)
*B62K 19/38* (2006.01)
*B62K 11/00* (2006.01)
*F16D 55/00* (2006.01)
*B60B 27/00* (2006.01)
*B62J 11/13* (2020.01)
*B62J 45/40* (2020.01)

(52) U.S. Cl.
CPC ............... *B62J 99/00* (2013.01); *B62K 19/38* (2013.01); *F16D 55/2265* (2013.01); *F16D 65/0068* (2013.01); B60B 27/0068 (2013.01); B62J 11/13 (2020.02); B62J 45/40 (2020.02); B62K 11/00 (2013.01); B62L 1/00 (2013.01); F16D 2055/0012 (2013.01); F16D 2055/0016 (2013.01)

(56) References Cited

U.S. PATENT DOCUMENTS

| | | | | |
|---|---|---|---|---|
| 8,093,887 | B2* | 1/2012 | Iemura | B60T 8/171 |
| | | | | 324/207.25 |
| 9,863,973 | B2* | 1/2018 | Kato | G01P 3/481 |
| 10,345,325 | B2* | 7/2019 | Yasuhara | G01P 3/44 |
| 2005/0247499 | A1* | 11/2005 | Toyoda | B62J 99/00 |
| | | | | 180/219 |
| 2009/0183957 | A1* | 7/2009 | Ishida | B60T 8/329 |
| | | | | 188/181 R |
| 2013/0026731 | A1* | 1/2013 | Mikura | B60B 27/0068 |
| | | | | 280/279 |
| 2015/0042062 | A1* | 2/2015 | Takatsuka | B62K 21/02 |
| | | | | 280/264 |
| 2015/0291250 | A1* | 10/2015 | Nagai | B62L 1/00 |
| | | | | 188/71.1 |
| 2017/0120981 | A1* | 5/2017 | Krauss | B62K 25/02 |
| 2017/0151833 | A1* | 6/2017 | Neutsch | B62L 3/023 |
| 2018/0043959 | A1* | 2/2018 | Yasuhara | B62L 1/00 |
| 2018/0117961 | A1* | 5/2018 | Ono | B62K 19/38 |
| 2019/0329747 | A1* | 10/2019 | Soatti | B62L 1/005 |

FOREIGN PATENT DOCUMENTS

JP   2007078549 A   *  3/2007
WO   2016/152557 A1     9/2016

* cited by examiner

SUPPORTING SYSTEM FOR A PHONIC WHEEL SENSOR

The present invention is referred to a supporting structure for a phonic wheel sensor and a brake caliper, of the type comprising a main body fastened to a fork stem, a wheel support and an extension for assembling a brake caliper.

In motorbikes equipped with ABS systems which, as it is known, include the use of a wheel and a relative sensor, various solutions are used to support the sensor in a position suitable for detecting the wheel speed.

One of the possible solutions is to connect the speed sensor holder to the brake caliper bracket.

For instance, U.S. Pat. No. 7,901,013 A describes a caliper support which bifurcates into an upper arm portion and a portion of the lower arm. On the portion of the lower arm an assembling area is formed, to assembly the wheel speed sensor.

More precisely, the support of the caliper externally has an inner rib on which a surface is defined, wherein the assembling area is defined, connected to the support of the phonic wheel speed sensor.

Such a solution and, more generally, other known solutions are not optimal in terms of structural robustness.

In particular, the supporting structures of phonic wheel sensors may be subject to strikes caused by moving objects during the running of the vehicle, and they may also suffer accidental bumps during the maintenance operations of the bike, e.g. when the bike is mounted on a stand, e.g. for the replacement of the front wheel.

In addition to this robustness concern, it is also required that the supporting structure does not involve complex machining for the manufacturing thereof. Many solutions in fact require that the sensor supporting structure be integrally formed with the stem of the fork and this may lead to difficulties in the realization of the component, typically made by molding.

In addition, aesthetic features must also be taken into account in the motorbike sector.

The need to limit weights and components therefore makes preferable to use cables for connection to the phonic wheel sensor left at sight but, without a proper protection, they are particularly subject to the risk of damage, e.g. after the contact with the brake disc, unless the cable is made to be extended externally, far away from the latter.

Such a solution, however, makes the cable particularly visible, generating a relatively unpleasant aesthetic impact and in any case representing a potential obstacle element during maintenance operations of the vehicle.

The technical problem underlying the present invention is to provide a phonic wheel sensor supporting structure inherently and functionally conceived to overcome one or more of the limitations above described with reference to the cited prior art.

Within the aforesaid problem, a main object of the invention is to develop a phonic wheel sensor supporting structure allowing a suitable protection against strikes, to reduce the risk of shocks and accidental breakage, both in running and during the maintenance operations.

A further object is to provide a supporting structure for phonic wheel sensor ensuring a high reliability of the sensor.

Another object of the present invention is to provide a phonic wheel sensor supporting structure which is appreciable from an aesthetic point of view.

Still, a further object is to provide a motorbike with a supporting structure for a phonic wheel sensor involving a simple manufacturing a and not requiring a complex machining.

Another object of the invention is to provide a phonic wheel sensor supporting structure wherein the sensor cable is at least partially covered without being subject to the risk of damage caused by moving components.

This problem is solved and the objects are met by the present invention through a supporting structure for a phonic wheel sensor and brake caliper realized in accordance with claim 1.

Preferred features of the invention are defined in the dependent claims.

The supporting structure according to the present invention allows to obtain a high level of phonic wheel sensor protection both during the running and when the vehicle is placed on a stand for maintenance operations.

In addition, the supporting structure of the present invention allows a suitable protection for the sensor cable, both at sight and with respect to any elements that could cause a damage thereof.

Moreover, said structure can be realized through a simple molding processing, without therefore requiring a complex mechanical machining.

According to preferred aspects, the invention also allows to provide high robustness and stiffness for supporting the brake caliper, albeit with reduced weights and overall size.

According to further aspects, the present invention also allows to position the sensor cable between the supporting structure and the brake disc thus avoiding a risk of damage.

According to other aspects, the invention also allows to support the brake caliper in a simple manner and without the need for additional components.

According to still other aspects, the present invention makes possible to effectively orient the sensor cable in the direction of the motorbike fender, possibly providing a protection of the same also in this area.

The characteristics and advantages of the invention will become clearer from the detailed description of two embodiments, described only by non-limiting example, with reference to the annexed drawings wherein.

Figure 1:
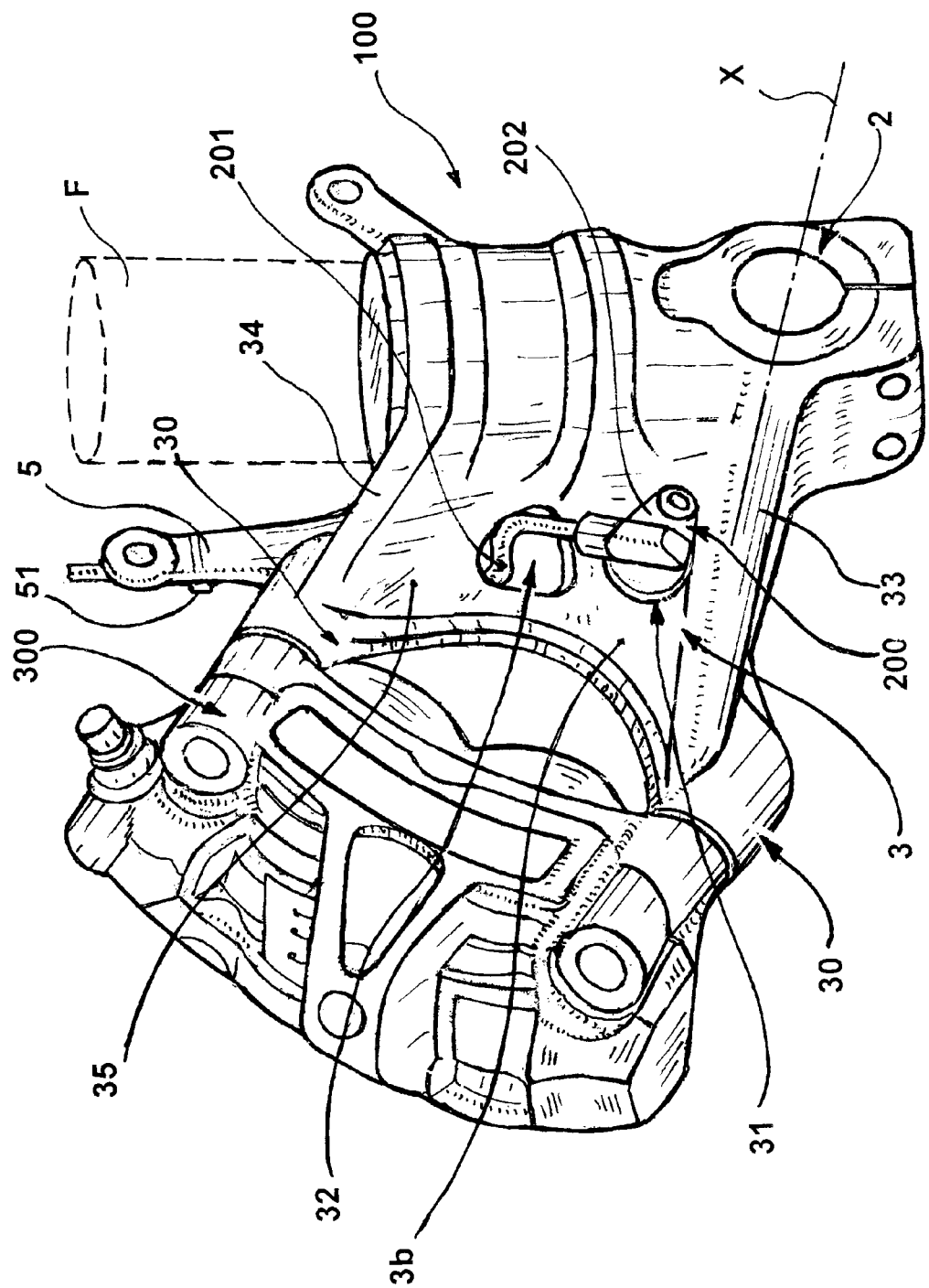
FIG. 1 is a perspective view from an outer side of the supporting structure according to the present invention.

With reference first to FIG. 1, with the reference number 100 is indicated as a whole a supporting structure for a phonic wheel sensor 200 and a brake caliper 300 formed in accordance with the present invention.

According to a preferred embodiment, the supporting structure 100 defines a so-called fork stem, namely the part of the terminal fork on which the wheel axle of the vehicle can be fastened.

In this case, the supporting structure can be fastened to a fork stem F, schematically shown in FIG. 1, and is preferably shaped in such a way that the part of the stem terminal can be housed in an appropriate seat.

It is, however, apparent that the supporting structure may be more generally fastened to the fork stem, possibly made in one integral piece with the same.

It must also be noted that the structure according to the present invention is normally intended for use in motorbikes, preferably having one or two front wheels, equipped with a brake assistance system, such as an ABS system. In a preferred embodiment, the structure according to the present invention finds application in the front wheel or wheels to support the front wheel axis, the brake caliper of the braking system serviced by the assistance system and the sensor of the phonic wheel used in the ABS system.

With reference to FIG. 1, the structure 100 according to the present invention comprises a main body 1, intended for being fastened to the fork stem F, to which a wheel support is connected, the support of the vehicle wheel occurs according to known modalities. In one embodiment, the wheel support 2 is shaped in such a way as to define a cylindrical housing which develops according to the 'axis of rotation X of the motorbike wheel.

From the main body 1 an extension 3 projects to support the brake caliper 300 and for the assembling thereof.

In a preferred embodiment, the main body 1, the wheel support 2 and the extension 3 are formed in an integral piece.

Preferably, the extension 3 comprises a fastening device 30 of the brake caliper 300 that, in a preferred embodiment, includes threaded members, not shown in the figure. By way of example, the brake caliper 300 may comprise two cylindrical seats wherein screws are inserted to engage respective threaded seats defining said threaded members.

According to a preferred embodiment, the extension 3 comprises a pair of ribs 33, 34. Preferably, the extension 3 comprises a lower rib 33 arranged, in use, towards a support surface of the vehicle, and an upper rib 34, opposite to the preceding one. In other words, the ribs 33, 34 define opposite edges of the extension 3 and surround the extension in the transverse direction.

In one embodiment, ribs 33, 34 are mutually divergent in the direction of displacement from the main body. Preferably, the ribs enclose an angle α from 10° to 40° therebetween.

As shown in FIG. 1, the extension 3 comprises a reinforcing plate 35 which preferably extends between the pair of ribs 33, 34.

Figure 2:
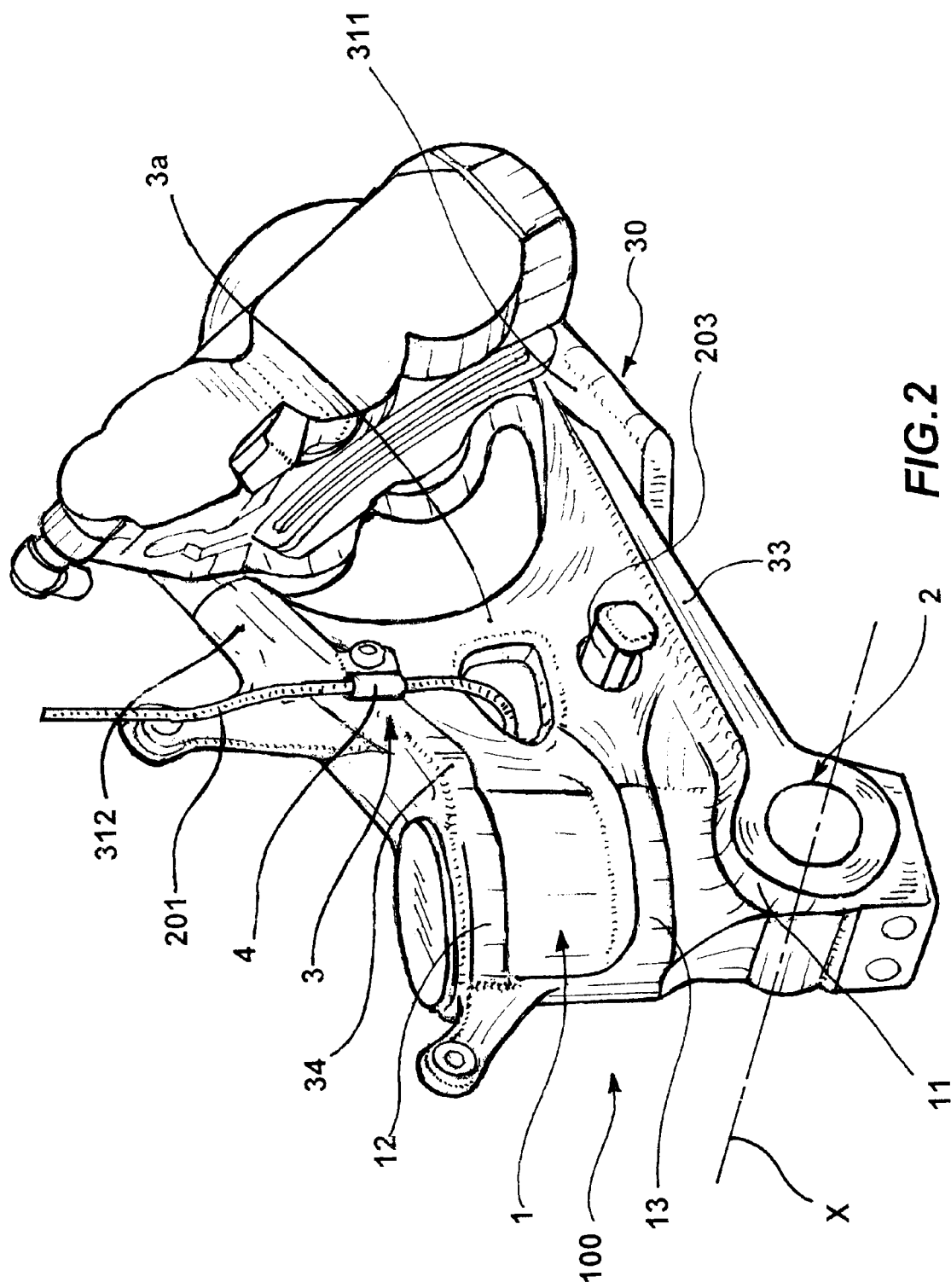
FIG. 2 is a perspective view from an inner side of the supporting structure of FIG. 1.
Figure 3:
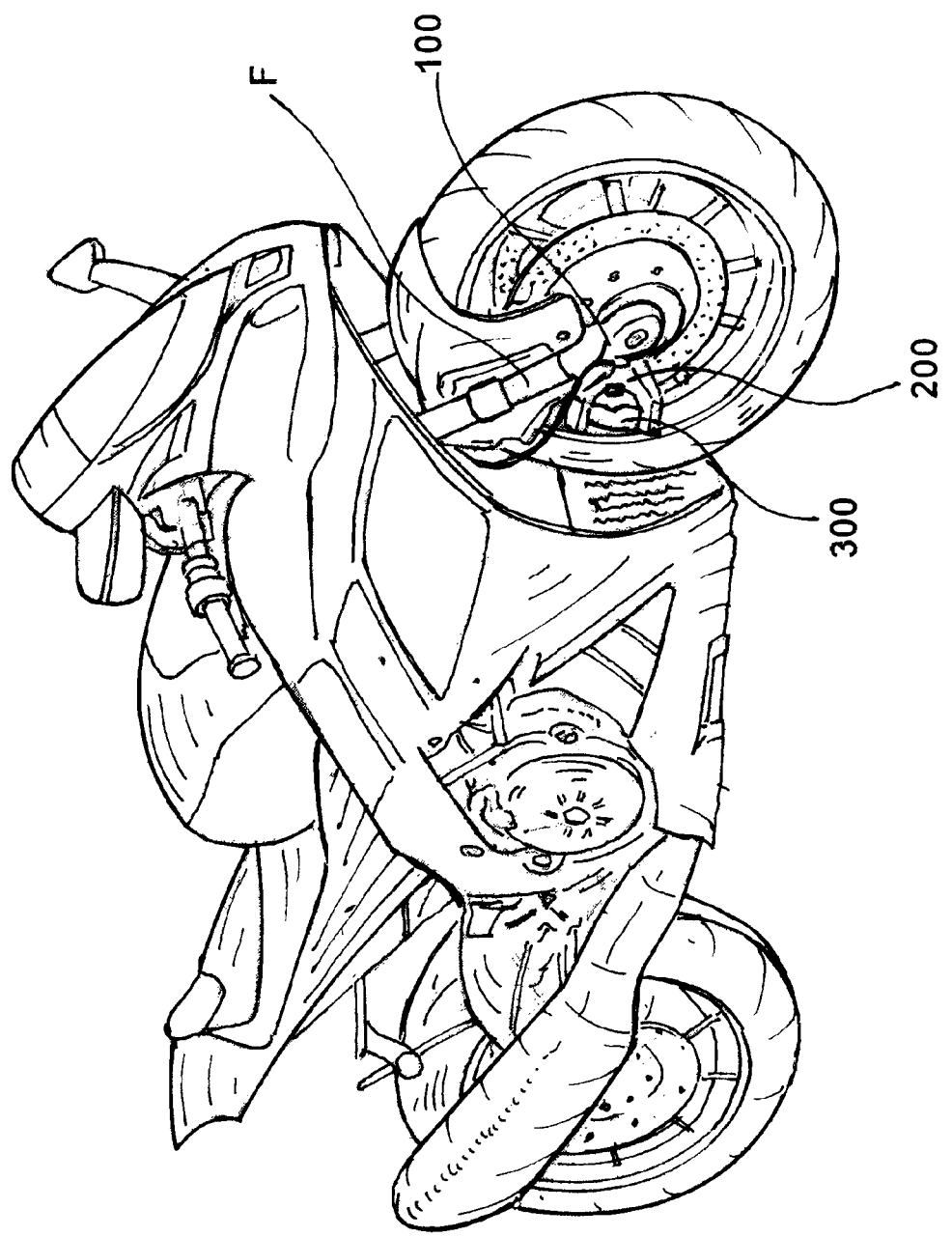
FIG. 3 is a schematic illustration of a motorbike comprising the supporting structure of the present invention.

Also with reference now to FIG. 2, according to this configuration, the extension 3 is preferably provided with a substantially H-shaped section turned of 90°, in which the arms of the H-shape are defined by the ribs 33 and 34. More generally, to produce such a configuration, the ribs 33, 34 may have a projection along a direction parallel to the axis of rotation X of the wheel greater than that of said reinforcing plate 35. It should be noted that this approach advantageously allows to achieve the maximum rigidity in the direction parallel to the wheel axis.

According to a further aspect of the invention, the ribs 33, forming the extension thickenings are, preferably, tapered in the direction away from the main body 1.

This latter feature also allows to optimally connect the main body 1 to the fastening device 30 of the brake caliper 300.

This is particularly advantageous in the case wherein the fastening device 30 to the brake caliper 300 comprises a pair of threaded members 311, 312, with each threaded member connected to a respective rib of said pair of ribs 33, 34, as indicated above.

It must also be noted that, according to a preferred embodiment, the main body 1 has a substantially cylindrical shaping, with the ribs 33, 34 joined to widened portions 11, 12 of the main body 1 itself. It is therefore apparent that such feature, together with the geometry of the ribs, makes it possible to limit the presence of accumulations of tension zones.

The configuration above described allows the extension 3 in general to confer robustness to the extension 3, while ensuring constructive simplicity and lightness.

It should also be noted that, in a preferred embodiment, the main body 10 may comprise a further expanded intermediate portion 13, always in favour of the structural features of the structure.

With reference now again to FIG. 1, two pass-through openings 31, 32 are formed within the extension 3. A first pass-through opening 31 is intended for housing the sensor 200 of the phonic wheel, and a second pass-through opening 32 is intended for placing the cable 201 of the sensor.

In other words, when the supporting structure 100 is used in a motorbike including a braking assistance system, the sensor 200 is located inside the first pass-through opening and the cable 201 is placed through the second pass-through opening 32.

In this way, the cable 201 is placed to extend from an outer face of the supporting structure 100, i.e. that face faced toward the outside of the motorbike, to an internal face of the same, and then oriented toward the inside of the motorbike. Preferably, the aforementioned faces are located on the extension 3, with a first face 3a, when in use corresponding to the inner face, facing a brake disc of the motorbike, and a second face 3b, corresponding to the outer face, opposite to the preceding one.

It should also be noted that preferably the second pass-through opening 32 is placed, when in use, at a position upper than the first pass-through opening 31, thus allowing the cable 201 to be directed upwards, approaching the zones of the motion wherein the control electronics and the other components necessary for the operation of the braking assistance system are housed.

In a preferred embodiment, the pass-through openings 31, 32 are both formed through the reinforcing plate 35, thus not affecting the ribs 33, 34.

Again with reference to FIG. 2, according to a preferred embodiment, the sensor 200 includes a fastening portion 202 and an operating portion 203. Preferably, the fastening portion 202 has an extension greater than the first pass-through opening 201 and it is shaped in such a manner and apt to be arranged rested on said outer face 3b.

In an embodiment, the sensor 200 is shaped so as said operating portion 203 and said fastening portion 202 are arranged one on the inner face and the other one on the outer face of the extension 3. This solution advantageously allows to simplify the assembly steps while ensuring a high precision in the positioning of the sensor. For an easy positioning and simplicity of the assembling of the sensor 100, an additional threaded hole can be provided on the extension 3 for securing the sensor through a corresponding screw.

In addition, to further facilitate the positioning of the cable 201, the supporting structure 100 preferably comprises a grommet device 4, e.g. realized by a clamp, a sleeve or even a shaped recess, which is attached to the extension 3. According to a preferred embodiment, the grommet device 4 is placed on the inner face 3a of the supporting structure 100, advantageously allowing an effective positioning of the cable in the previously described configuration.

Preferably, the grommet device 4 is attached in correspondence to the upper rib 34, thereby ensuring that it remains adjacent to the supporting structure 100 in the position closest to the brake disc.

In one embodiment, the grommet device 4 is attached by a screw or another threaded member to the inner face 3a. This solution is particularly advantageous as it allows the cable to be fastened without the need of significant structural changes to the supporting structure 100. Moreover, it is particularly advantageous when a clamp is used as grommet device 4.

In a further embodiment, not shown in detail in the figures, the grommet device 4 is formed by a shaped recess, e.g. a pass-through hole, formed at the inner face 3a. Preferably, the shaped recess is realized on the upper rib and, even more preferably, it is formed therethrough.

In a further aspect, the supporting structure 100 includes a fastening arm 5 which allows the fender to be assembled to the motorbike.

Always for the purpose of optimally assembling the cable 201 according to a preferred embodiment, the fastening arm 5 has a cable guide 51 thereby the cable 201 may be assembled, e.g. by interference in a seat defined by the guide 51 itself. It should also be noted that, also to allow the cable to be concealed, the cable guide 5 is preferably turned in use to the motorcycle wheel.

Thanks to the features of the invention, the supporting structure 100 allows a precise assembling of the phonic wheel sensor 200, while ensuring high level of protection to the cable, both from the visual point of view and from that of any damage.

The supporting structure according to the present invention allows to arrange the cable 201 between the supporting structure 100 and the brake disc, while maintaining it adjacent to the supporting structure itself.

The invention claimed is:

1. A motorbike comprising:
   a brake comprising a brake disc and a brake caliper co-acting with said brake disc;
   a braking assistance system including a wheel, a wheel speed sensor, and a related cable for transmitting a signal of said wheel speed sensor; and
   a supporting structure comprising a main body fastened or configured to be fastened to a stem of a fork of said motorbike, a wheel support connected to said main body for supporting said wheel and an extension which develops from said main body and said extension comprising a fastening device for said brake caliper, wherein two through openings are formed in said extension, said two through opening comprising a first pass-through opening and a second pass-through opening, wherein said wheel speed sensor is placed inside said first pass-through opening and said cable is placed through said second pass-through opening so as to extend from an outer face of said supporting structure outwardly facing with respect to the motorbike to an internal face of said supporting structure facing an interior of said motorbike, wherein at least a portion of the cable extends along said internal face of said supporting structure between said supporting structure and said brake disc.

2. A motorbike as claimed in claim 1, wherein said supporting structure further comprises a grommet device, wherein said grommet device is assembled on said internal face of said supporting structure.

3. A motorbike according to claim 1, wherein said wheel speed sensor comprises a fastening portion and an operating portion in which a sensor member is placed, said fastening portion having an extension greater than said first pass-through opening and said fastening portion being configured to be arranged on said outer face, said wheel speed sensor being shaped such that one of said operating portion and said fastening portion is arranged on the inner face and another one of said operating portion and said fastening portion is arranged on said outer face when said wheel speed sensor is placed through said first pass-through opening.

4. A motorbike according to claim 2, wherein said grommet device faces the wheel of the motorbike when in use.

5. A motorbike according to claim 1, wherein said supporting structure further comprises a pair of ribs defining opposite edges of said extension and a reinforcing plate extending between said pair of ribs, said first pass-through opening and said second pass-through opening being defined in said reinforcement plate.

6. A motorbike according to claim 5, wherein said pair of ribs comprises a lower rib arranged, in use, towards a motorbike supporting surface, and an upper rib, opposite said lower rib, wherein an operative part of a grommet is fastened or fastenable to said upper rib.

7. A motorbike according to claim 5, wherein said fastening device of the brake caliper comprises threaded members extending from said pair of ribs.

8. A motorbike according to claim 1, wherein said support structure further comprises a fastening arm of a motorbike fender including a fairlead guide for fastening said cable of said phonic wheel sensor on said fastening arm.

9. A motorbike according to claim 8, wherein said fairlead guide faces, in use, towards the wheel of the motorbike.

10. A motorbike according to claim 1, wherein said second pass-through opening is arranged, in use, in an upper position with respect to said first pass-through opening.

11. A motorbike according to claim 1, wherein said main body, said wheel support and said extension are formed in an integral piece.

12. A motorbike according to claim 1, wherein said supporting structure further comprises a grommet device fastened to or fastenable to said extension.

13. A motorbike according to claim 12, wherein said grommet device faces the wheel of the motorbike when in use.

14. A motorbike according to claim 1, wherein:
   said sensor extends through said first through opening;
   said sensor has a first sensor end projecting from said internal face of said supporting structure facing said brake disc;
   said sensor has a second end projecting from said outer face of said supporting structure opposite said brake disc;
   said cable is connected to said second end of said sensor; and
   said cable extends from said second end of said sensor along said outer surface of said supporting structure, through said second through opening towards said internal face of said supporting structure and further extends along said internal surface of said supporting structure.

15. A motorbike comprising:
   a brake comprising a brake disc and a brake caliper cooperating with said brake disc;
   a braking assistance system comprising a wheel, a wheel speed sensor, and a cable for transmitting a signal of said wheel speed sensor; and
   a supporting structure comprising a main body fastened to or configured to be fastened to a stem of a fork of said motorbike, a wheel support connected to said main body for supporting said wheel and an extension extending from said main body, said extension comprising a fastening device for said brake caliper, said extension comprising a first pass-through opening and a second pass-through opening, said first pass-through opening being located at a spaced location from said second pass-through opening, wherein a portion of said extension is located between said first pass-through opening and said second pass-through opening, at least a portion of said wheel speed sensor being arranged in said first pass-through opening, said supporting structure comprising an outer surface facing in a direction away from said brake disc and said supporting structure comprising an internal surface facing in a direction of said brake disc, said portion of said extension defining a portion of said internal surface and a portion of said outer surface, said cable extending from at least said outer surface to at least said internal surface, at least a portion of said cable extending through said second pass-through opening, at least another portion of said cable extending along said internal surface between said supporting structure and said brake disc.

16. A motorbike according to claim 15, wherein:
said sensor extends through said first through opening;
said sensor has a first sensor end projecting from said internal face of said supporting structure facing said brake disc;
said sensor has a second end projecting from said outer face of said supporting structure opposite said brake disc;
said cable is connected to said second end of said sensor; and
said cable extends from said second end of said sensor along said outer surface of said supporting structure, through said second through opening towards said internal face of said supporting structure and further extends along said internal surface of said supporting structure.

17. A motorbike according to claim 15, wherein said portion of said extension defines a portion of said first pass-through opening and a portion of said second pass-through opening, wherein a portion of said cable extends along an area of said portion of said extension.

18. A motorbike comprising:
a brake comprising a brake disc and a brake caliper cooperating with said brake disc;
a braking assistance system comprising a wheel, a wheel speed sensor, and a cable for transmitting a signal of said wheel speed sensor; and
a supporting structure comprising a main body fastened to or configured to be fastened to a stem of a fork of said motorbike, a wheel support connected to said main body for supporting said wheel and an extension extending from said main body, said extension comprising a fastening device for said brake caliper, said extension comprising a first pass-through opening and a second pass-through opening, said first pass-through opening being located at a spaced location from said second pass-through opening, wherein a portion of said extension extends between said first pass-through opening and said second pass-through opening, at least a portion of said wheel speed sensor being arranged in said first pass-through opening, said supporting structure comprising a first side facing in a direction away from said brake disc and said supporting structure comprising a second side facing in a direction of said brake disc, said cable extending at least from said first side to at least said second side, said portion of said extension comprising a first portion surface and a second portion surface, said first portion surface being located on said first side, said second portion surface being located on said second side, at least a portion of said cable extending through said second pass-through opening, at least another portion of said cable extending along said second side between said supporting structure and said brake disc.

19. A motorbike according to claim 18, wherein:
said sensor extends through said first through opening;
said sensor has a first sensor end projecting from said internal face of said supporting structure facing said brake disc;
said sensor has a second end projecting from said outer face of said supporting structure opposite said brake disc;
said cable is connected to said second end of said sensor; and
said cable extends from said second end of said sensor along said outer surface of said supporting structure, through said second through opening towards said internal face of said supporting structure and further extends along said internal surface of said supporting structure.

20. A motorbike according to claim 18, wherein said portion of said extension defines a portion of first pass-through opening and a portion of said second pass-through opening, wherein a portion of said cable extends along an area of said portion of said extension.

* * * * *